(12) United States Patent
Hunyady et al.

(10) Patent No.: US 8,391,453 B2
(45) Date of Patent: *Mar. 5, 2013

(54) ENABLING INCOMING VOIP CALLS BEHIND A NETWORK FIREWALL

(75) Inventors: Attila J Hunyady, Milpitas, CA (US); Chunsheng Xie, Cupertino, CA (US); Xiaodong Zhu, Fremont, CA (US); Feng Zhou, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 192 days.

This patent is subject to a terminal disclaimer.

(21) Appl. No.: 12/884,595

(22) Filed: Sep. 17, 2010

(65) Prior Publication Data

US 2011/0010752 A1   Jan. 13, 2011

Related U.S. Application Data

(63) Continuation of application No. 10/970,735, filed on Oct. 22, 2004, now Pat. No. 7,826,602.

(51) Int. Cl.
*H04M 11/00* (2006.01)

(52) U.S. Cl. .............. 379/93.09; 370/389; 370/352; 726/11

(58) Field of Classification Search ............. 726/1, 11, 726/12, 13, 14; 709/245, 227; 370/352, 370/401, 389; 379/93.09
See application file for complete search history.

(56) References Cited

U.S. PATENT DOCUMENTS

| | | | |
|---|---|---|---|
| 6,061,798 A | 5/2000 | Coley et al. | |
| 6,615,236 B2 | 9/2003 | Donovan et al. | 709/203 |
| 6,701,432 B1 | 3/2004 | Deng et al. | 713/153 |
| 7,047,561 B1* | 5/2006 | Lee | 726/12 |
| 2002/0051463 A1 | 5/2002 | Higuchi | |
| 2002/0138622 A1 | 9/2002 | Dorenbosch et al. | |
| 2003/0115344 A1 | 6/2003 | Tang et al. | |
| 2003/0233471 A1 | 12/2003 | Mitchell et al. | |
| 2004/0034776 A1* | 2/2004 | Fernando et al. | 713/171 |
| 2004/0034793 A1 | 2/2004 | Yuan | 713/200 |
| 2004/0037268 A1* | 2/2004 | Read | 370/352 |
| 2004/0059942 A1 | 3/2004 | Xie | 713/201 |
| 2004/0085952 A1* | 5/2004 | Watson | 370/352 |
| 2004/0139230 A1 | 7/2004 | Kim | 709/245 |
| 2004/0177274 A1* | 9/2004 | Aroya | 713/201 |
| 2005/0033985 A1* | 2/2005 | Xu et al. | 713/201 |
| 2005/0125532 A1* | 6/2005 | Kimchi | 709/225 |
| 2005/0201357 A1 | 9/2005 | Poyhonen | |

(Continued)

OTHER PUBLICATIONS

Stefan Brunner et al.: "Voice Over IP 101, Understanding VoIP Networks," Juniper Networks White Paper, Aug. 2004, 24 pgs.

(Continued)

*Primary Examiner* — Olisa Anwah
(74) *Attorney, Agent, or Firm* — Harrity & Harrity, LLP

(57) ABSTRACT

A network device is configured to receive a registration message from a private user device including a private internet protocol (IP) address associated with the private user device. A public IP address and discrete port number are assigned to the private user device and private IP address and stored in an incoming call table. The registration message is translated to include the public IP address and discrete port number. The registration message is forwarded to a proxy server for registration. An incoming call invitation message is received from a public user device, where the call invitation message is directed to the public IP address and discrete port number associated with the private user device. The call invitation message is translated to include the private IP address associated with the private user device based on the received public IP address and discrete port number and the incoming call table. The call invitation message is forwarded to the private user device.

20 Claims, 4 Drawing Sheets

U.S. PATENT DOCUMENTS

| | | | |
|---|---|---|---|
| 2005/0210292 | A1 | 9/2005 | Adams et al. |
| 2006/0013211 | A1 | 1/2006 | Deerman et al. |
| 2006/0029083 | A1* | 2/2006 | Kettlewell et al. ............ 370/401 |
| 2006/0050700 | A1* | 3/2006 | Ravikumar et al. .......... 370/389 |
| 2006/0056409 | A1 | 3/2006 | Piche et al. |
| 2006/0085548 | A1* | 4/2006 | Maher et al. .................. 709/227 |
| 2006/0168321 | A1 | 7/2006 | Eisenberg et al. |
| 2007/0019634 | A1* | 1/2007 | Fisher et al. .................. 370/352 |
| 2007/0076702 | A1 | 4/2007 | Yang |
| 2007/0124489 | A1* | 5/2007 | Swander et al. ............. 709/230 |
| 2007/0192508 | A1* | 8/2007 | Sollee ........................... 709/245 |
| 2009/0022102 | A1 | 1/2009 | Nykanen et al. |

OTHER PUBLICATIONS

B. Biggs: "A SIP Application Level Gateway for Network Address Translation," Internet Draft Memo, Mar. 2000, 7 pgs.

C. Martin et al.: "SIP Through NAT Enabled Firewall Call Flows," Internet Draft Memo, Jul. 2001, 11 pgs.

Cisco Systems White Paper, "H.323 and SIP Integration," print date Oct. 13, 2004, 6 pgs.

Josef Glasmann et al.: "Service Architectures in H.323 and SIP—A Comparison," Munich University of Technology, print date Oct. 13, 2004, 15 pgs.

IXIA Technology Guide, "Session Initiation Protocol (SIP) Technology," Copyright 1998-2004, print date Oct. 13, 2004, 12 pgs.

Ubiquity White Paper, "Understanding SIP, Today's Hottest Communications Protocol Comes of Age," print date Oct. 12, 2004, 5 pgs.

"Basics about SIP," http://spsc.inw.tugraz.at/courses/asp/ss01/sip/SIP_descr.htm, print date Oct. 15, 2004, 28 pgs.

"Solving the Firewall and NAT Traversal Issues for Multimedia Services over IP," Newport networks, print date Oct. 14, 2004, 14 pgs.

Peter Morrissey: "It's Time to Take a Look at SIP," Digital Convergence Workshop, Apr. 17, 2003, 4 pgs.

Gordon Daugherty: "Traversing Firewalls with Video over IP: Issues and Solutions," Visual Communications White Paper, Aug. 2003, 7 pgs.

Ingate Systems AB and Intertex Data AB White Paper by Lisa Hallingström et al.: "The SIP Protocol and Firewall Traversal," Oct. 11, 2001, 6 pgs.

A RADVision Technology White Paper, "Traversal of IP Voice and Video Data through Firewalls and NATs," 2001, 18 pgs.

Vinod K. Bhat: "Voice Over IP—The SIP Way," *Technology Review #2001-03*, Tata Consultancy Services, Apr. 2001, 13 pgs.

William Stallings: "The Session Initiation Protocol," *The Internet Protocol Journal Archived Issues*, vol. 6, Issue 1, Mar. 2003, Cisco Systems, 9 pgs.

Internet Engineering Task Force Internet Draft Memo by J. Rosenberg et al.: "NAT and Firewall Scenarios and Solutions for SIP," Jun. 24, 2002, 58 pgs.

"Traversing Firewalls and NATs With Voice and Video Over IP, An Examination of the Firewall/NAT Problem, Traversal Methods, and Their Pros and Cons," Wainhouse Research, Apr. 2002, 14 pgs.

http://www.informatik.uni-bremen.de/~prelle/terena/cookbook/main/ch04s07.html, Chapter 4.7. Firewalls and NAT, print date Oct. 15, 2004, 8 pgs.

Victor Paulsamy et al.: "Network Convergence and the NAT/Firewall Problems," Proceedings of the 36th Hawaii International Conference on System Sciences—2003, 10 pgs.

Master's Thesis by Fredrik Thernelius, "SIP, NAT, and Firewalls," May 2000, Ericsson Department of Teleinformatics, 69 pgs.

Co-pending U.S. Appl. No. 10/970,735, filed Oct. 22, 2004 entitled "Enabling incoming VOIP calls behind a network firewall" by Hunyady et al., 35 pages.

\* cited by examiner

ENABLING INCOMING VOIP CALLS BEHIND A NETWORK FIREWALL

RELATED APPLICATIONS

This application is a continuation of U.S. patent application Ser. No. 10/970,735 filed on Oct. 22, 2004, entitled "ENABLING INCOMING VOIP CALLS BEHIND A NETWORK FIREWALL," the disclosure of which is incorporated herein by reference.

BACKGROUND OF THE INVENTION

A. Field of the Invention

The principles of the invention relate generally to packet-based telephony services, and more particularly, to handling of transmission of multimedia related messages across network protection devices, such as firewalls.

B. Description of Related Art

With the increasing ubiquity of the internet and internet availability, there has been an increasing desire to leverage its robust and inexpensive architecture for voice telephony services, commonly referred to as voice over IP (internet protocol), or VoIP. Toward this end, standards for internet telephony have been promulgated by the both the International Telecommunication Union Telecommunication Standardization Sector (ITU-T) in the form of H.323 rev 5 (2003), "Packet based multimedia communications systems" as well as the Internet Engineering Task Force (IETF) in the form of RFC 3261 (2002), "Session Initiation Protocol (SIP)" to enable set-up and teardown of the media sessions.

Under each of these standards, a call invitation message is initially routed between a calling party and a proxy server or H.323 gatekeeper (collectively, "proxy server"). The proxy server performs name resolution, call processing, number lookup, routing, and any other required processing of the call invitation message. The call invitation message also typically includes a session description portion that contains information about the media that the caller wishes to use for the session. The proxy server then forwards the call invitation message to the called party (sometimes via redirect servers or other intermediary entities). In response to the received invitation message, a response message having a similar session description portion may be returned to the calling party via the proxy server. When the calling party receives the response message, it forwards an acknowledgement message to the called party. This completes call setup and enables subsequent exchange of real-time media directly between the calling and called parties, or their agents (e.g., firewalls, etc.).

All of the messages exchanged are typically in the form of a packet of data having both header and payload information. With most forms of signaling information being contained in packet headers, information relating to the media being exchanged between the parties is typically contained within the payload portion. In addition, addressing information, such as Internet Protocol (IP) addresses, Uniform Resource Locators (URL's), Uniform Resource Identifies (URI's), or UDP addresses, etc. for both the calling and called parties may be contained in both the header and payload. The existence of addressing information in packet payloads has caused difficulties with respect to both firewall and network address translation (NAT) implementation.

In most modern network environments, firewalls constitute the main protection mechanism for keeping unwanted traffic away from a private network. In general, a firewall is positioned between the private network and the public network such that all traffic passing between the two networks first passes through the firewall. The traffic may then be subjected to various filtering policies which identify the types and sources/destinations of traffic permitted to flow based upon information contained within the packet headers. One example filtering policy may be to permit all outgoing traffic (e.g., to any destination address) from IP address 134.138.29.17 (the source address) on port 8080 (the source port). Conversely, incoming traffic to 134.138.29.17 on port 8080 may not be permitted unless initially requested by 134.138.29.17. By enabling the enforcement of these various policies, only known and identifiable types of network traffic may be allowed to enter or exit the private network, thereby providing security to the network.

Unfortunately, it is the rigorous and strict nature of most existing firewalls that typically prevent successful establishment of VoIP sessions. For example, addressing information relating to the media exchange between parties is typically contained with the session description portion of a VoIP packet's payload. For example, in a SIP session, addresses and related port(s) on which media is expected is included within the session description protocol (SDP) information found in the message's payload. This information is dynamically assigned upon generation of the each message and cannot be adequately predicted by the firewall. Accordingly, when media from either party is received at the firewall, its passage is denied because no enabling policy is identified. The alternative to blanket denial is to leave a wide range of ports unprotected to facilitate passage of the media. Clearly, this is untenable from a security standpoint. To remedy this issue, intelligent Application Level Gateways (ALG) may be implemented on the firewall which identify VoIP messages as they are received at the firewall. The VoIP messages are then parsed for information contained within their headers and payloads.

In addition to problems posed by the restrictive nature of firewalls alone, many firewalls also implement NAT. Generally speaking, NAT is a technology for enabling multiple devices on a private local area network (LAN) having private IP addresses to share a single, or pre-defined group of public IP addresses. Because the private IP addresses maintained by the devices are not routable from outside of the LAN, the NAT must perform translation between the private and public IP addresses at the point where the LAN connects to the public network.

In operation, when a device on the LAN wishes to initiate a connection with a device outside of the LAN, the device will send all traffic to the NAT first. The NAT examines the header of each outgoing packet and replaces the source or return address contained therein, which is the device's private address, with its own public address before passing the traffic to its destination on the Internet. When a response is received, the NAT queries the NAT table, identifies the proper recipient and passes the response to that device.

Unfortunately, existing NAT techniques fail to address issues surrounding unsolicited incoming packets, such as those associated with incoming VoIP calls. Additionally, because addressing information for VoIP traffic may also be contained within the payload information as well as the header of packets, existing NATs may fail to accurately translate all outgoing or incoming traffic, resulting in dropped or failed connections.

SUMMARY OF THE INVENTION

One aspect consistent with principles of the invention is directed to a method for enabling voice over internet protocol (VoIP) calls across a firewall. The method includes receiving a registration message from a private user device including a private internet protocol (IP) address associated with the private user device. The private user device and private IP address are associated with a public IP address and discrete port number. The registration message is translated to include the public IP address and discrete port number and the registration message is forwarded to a proxy server for registration.

A second aspect consistent with principles of the invention is directed toward a network device for enabling voice over internet protocol (VoIP) calls across a firewall. The network device may include a private network link configured to receive a registration message from a private user device, where the registration message includes a private internet protocol (IP) address associated with the private user device; a public network link configured to communicate with a proxy server and one or more public user devices; network address translation (NAT) logic configured to perform NAT processing for translating the registration message to include a public IP address and discrete port number associated with the private user device based on the associated private IP address; and logic for forwarding the registration message to the proxy server for registration via the public network link.

In a third aspect consistent with principles of the invention, a device may include means for receiving a registration message from a private user device including a private internet protocol (IP) address associated with the private user device; means for associating the private user device and private IP address with a public IP address and discrete port number; means for translating the registration message to include the public IP address and discrete port number; means for forwarding the registration message to a proxy server for registration; means for receiving a call invitation message from a public user device, where the call invitation message is directed to the public IP address and discrete port number associated with the private user device; means for retrieving the private IP address associated with the private user device; means for translating the call invitation message to include the private IP address associated with the private user device; and means for forwarding the call invitation message to the private user device.

In a fourth aspect consistent with principles of the invention, a method is provided for enabling voice over internet protocol (VoIP) calls across a firewall performing network address translation (NAT). The method may include receiving a registration message from a private user device including a private internet protocol (IP) address associated with the private user device. A public IP address and discrete port number are assigned to the private user device and private IP address. The associated private user device, private IP address, and public IP address and discrete port number are stored in an incoming call table. The registration message is translated to include the public IP address and discrete port number. The registration message is forwarded to a proxy server for registration. A security policy is established to enable incoming call messages to pass the firewall based upon type. A call invitation message is received from a public user device, where the call invitation message is directed to the public IP address and discrete port number associated with the private user device. It is determined whether the call invitation message satisfies the established security policy. The private IP address associated with the private user device is retrieved from the call lookup table, if it is determined that the call invitation message satisfies the established security policy. The call invitation message is translated to include the private IP address associated with the private user device, and the call invitation message is forwarded to the private user device.

In a fifth aspect consistent with principles of the invention, a method is provided for enabling voice over internet protocol (VoIP) calls across a firewall performing network address translation (NAT). The method may include establishing a security policy to enable incoming call messages to pass the firewall based upon type. A call invitation message is received from a public user device, the call invitation message being directed to a public IP address and discrete port number associated with a private user device. It is determined whether the call invitation message satisfies the established security policy. A private IP address associated with the private user device is retrieved from an incoming call lookup table, if it is determined that the call invitation message satisfies the established security policy. The call invitation message is translated to include the private IP address associated with the private user device, and the call invitation message is forwarded to the private user device based on the private IP address.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

System Overview

Figure 1:
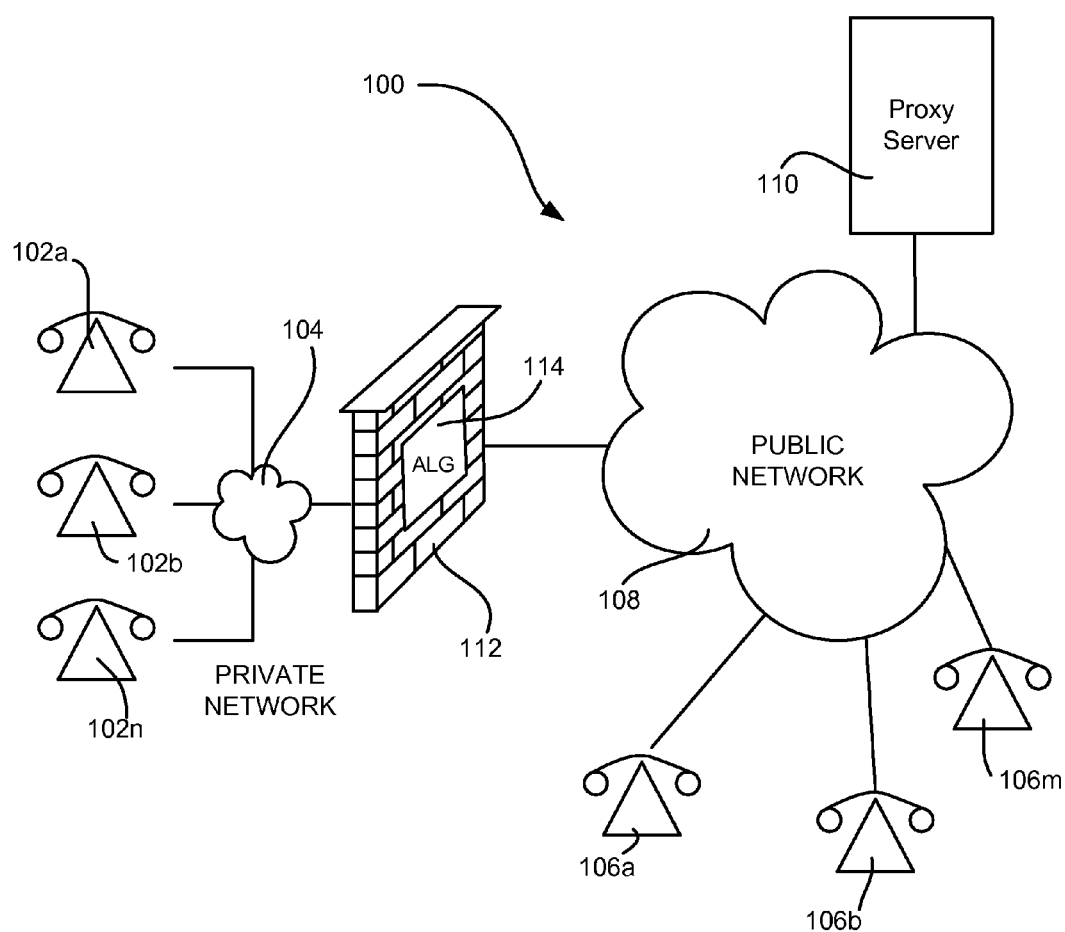
FIG. 1 illustrates an exemplary system in which systems and methods, consistent with the present invention, may be implemented.

FIG. 1 illustrates an exemplary system 100 in which systems and methods, consistent with principles of the invention, may be implemented. As illustrated, system 100 may include a group of user devices 102a, 102b, and 102n (collectively, "user devices 102") connected to a private network 104, a group of user devices 106a, 106b, and 106m (collectively, "user devices 106") connected to a public network 108, a proxy server 110 connected to public network 108, and a firewall 112 that provides an interface between private network 104 and public network 108. It should be understood that the number and type of user devices 102 and 106 illustrated in FIG. 1, are provided for simplicity. In practice, a typical system may include any practical number and type of user devices 102 and 106. In addition, although only a single proxy server 110 has been illustrated for simplicity, in practice, multiple proxy servers may be implemented for providing call processing and routing functionality for a VoIP call.

User devices 102 and 106 may include devices, such as personal computers, laptops, SIP telephone devices, H.323 telephone devices, analog telephone devices, or other devices capable of initiating, transmitting, and/or receiving voice and data communications via either private network 104 or a combination of private network 104 and public network 108. User devices 102 and 106 facilitate real-time audio and/or video communications across public network 108 via firewall 112.

It should be understood that public network 108 may include one or more networks, such as the Internet, an insecure intranet, a local area network (LAN), a wide area network (WAN), or another type of network that is capable of transmitting voice and data communications from a source device to a destination device. Further, both private network 104 and public network 108 may also include one or more public switched telephone networks (PSTNs) and associated gateway devices.

Proxy server 110 may be any suitable type of VoIP proxy server or gatekeeper device that functions to provide name resolution and routing functionality for VoIP call messages. Examples of suitable proxy servers include SIP proxy servers that directly forward received requests to called parties, redirect proxy servers which return location information to calling parties for subsequent direct communication with called parties and H.323 gatekeepers.

As will be described in additional detail below, firewall 112 may include any combination of hardware and software capable of applying security policies to network traffic between user devices 102 and 106 and proxy server 110. In one implementation consistent with principles of the invention, firewall 112 may be configured to include an application level gateway (ALG) 114 that performs advanced network address and port translation (NAPT) services on network traffic routed across firewall 112 to/from private network 104 in order to enable multiple user devices 102 to share a single, publicly routable IP address. As described above, NAPT helps protect the private network from exposure to unwanted traffic by translating private IP addresses and ports into publicly routable IP addresses and ports, which are then used to identify the local user to remote users. Additionally, NAPT provides for efficient scalability of private network 104, since additional IP addresses need not be provisioned by a network service provider prior to integration into private network 104.

In the case of a SIP REGISTER message, source or caller IP address and port information may be contained within a Contact field of the packet header. The Contact field typically relates to the calling party's IP or SIP address. Additionally, addressing information may be included within the SDP information. SDP information typically includes information relating to a desired media session, including session name and purpose, session time, type of media (e.g., voice or video), media format (e.g., MPEG), transport protocol and port number, bandwidth requirements, and contact information. By performing NAPT on the above-identified address and port information, firewall 112 may secure user devices 102 from unauthorized access and identification.

Figure 2:
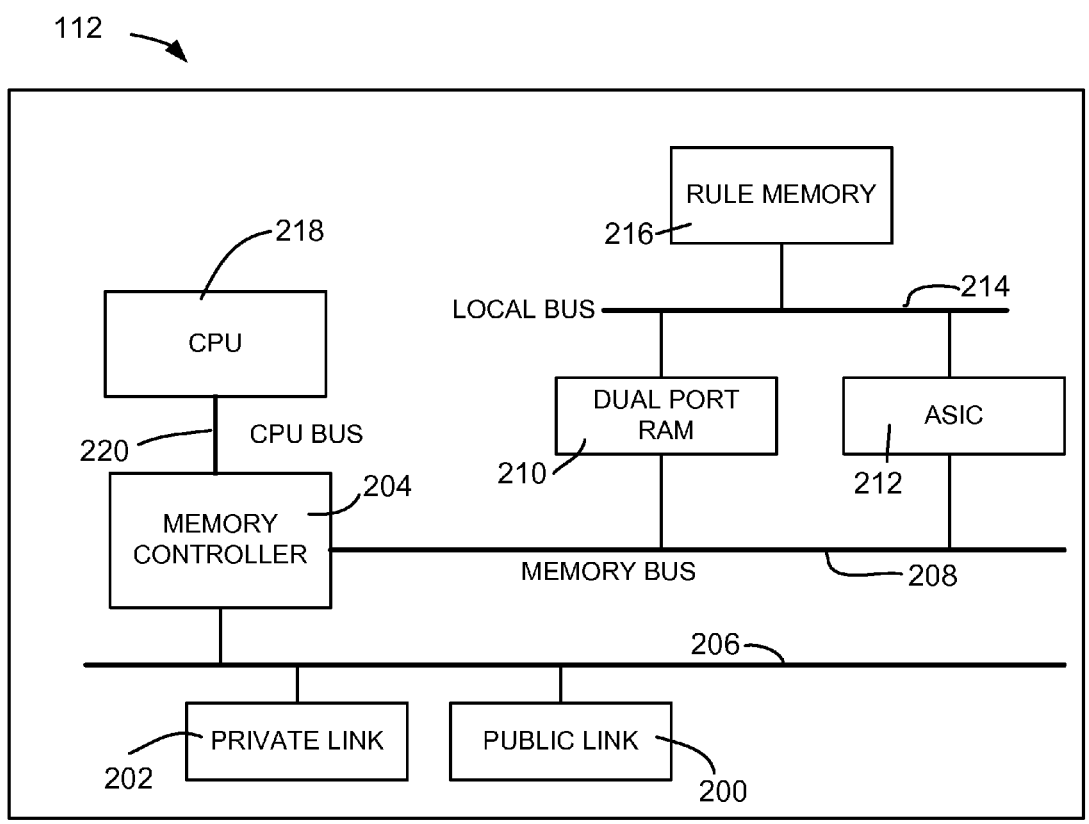
FIG. 2 illustrates an exemplary configuration of a firewall in an implementation consistent with principles of the invention.

FIG. 2 illustrates an exemplary configuration of firewall 112 in an implementation consistent with principles of the invention. As illustrated, firewall 112 may include a public network link 200, a private network link 202, and memory controller 204 coupled by a bus 206, a memory bus 208 for connecting memory controller 204 to dual port memory 210 and application specific integrated circuit (ASIC) 212, a local bus 214 for connecting dual port memory 210 and ASIC 212 to rule memory 216, and a CPU 218 coupled to memory controller 204 by CPU bus 220.

In operation, firewall 112 may be a gateway between two distinct networks, or distinct portions of a network. The gateway can bridge between trusted and untrusted portions of a network or provide a bridge between a public and private network. Each network link 200 and 202 may be an Ethernet link that includes an Ethernet media access controller (MAC) and Ethernet physical layer (PHI) for allowing the communication system to receive/send packets from/to networks.

Memory bus 208 may couple memory controller 204 to a dual-port memory 210 and ASIC 212 for performing firewall and NAPT functionality. ASIC 212 may include a firewall engine, NAPT logic, authentication logic and additional processing capabilities. Local bus 214 may also link ASIC 212 to dual-port memory 210. Dual-port memory 210 may be a random access memory (RAM) having two separate ports. Any memory location may be accessed from the two ports in the same time. Associated with ASIC 212 may be off-chip rule memory 216 for storing a portion of the software rules for screening packets. Local bus 214 couples rule memory 216 to ASIC 212. In one implementation, off-chip rule memory 216 may be a static RAM and may be used to store policy data.

Central processor (CPU) 218 may be coupled to memory controller 204 by CPU bus 220. In operation, CPU 218 oversees the memory transfer operations on memory bus 208 and bus 206.

Exemplary Processing

Figure 3:
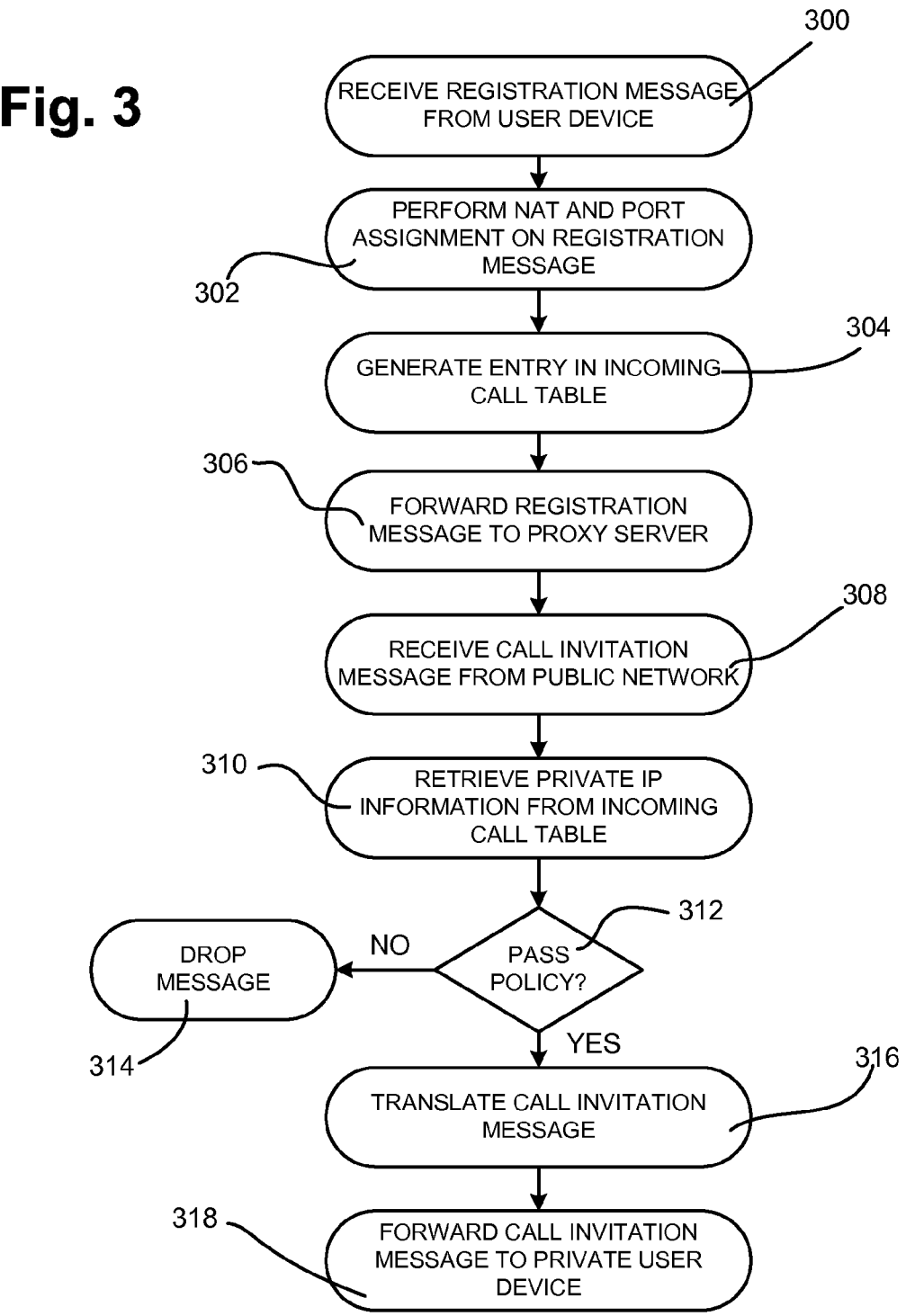
FIG. 3 illustrates an exemplary process for enabling incoming calls across a firewall in an implementation consistent with principles of the invention.

FIG. 3 illustrates an exemplary process for enabling incoming calls across firewall 112 from a user device 106*a* on public network 108 to a user device 102*a* on private network 104 in an implementation consistent with principles of the invention. Processing may begin with firewall 112 receiving a registration message from a user device 102*a* (act 300). As is known in the art, prior to making or receiving any VoIP calls, user device 102*a* first sends a VoIP registration message to proxy server 110, including addressing information relating to user device 102*a*, such that subsequent requests for service (e.g., an incoming phone call) may be identified and properly routed by proxy server 110. In the SIP protocol, the registration message is called a REGISTER message, whereas in H.323, it is referred to as a Registration Request message. In the firewall scenario described herein, this registration message is first received by firewall 112, prior to transmission on public network 108.

In accordance with one implementation consistent with principles of the invention, the registration message may be a SIP REGISTER message including data fields relating to TO, FROM, and CONTACT addresses/ports (or URL's associated therewith) and an EXPIRATION field relating to the length of the registration. As is known in the art, for a REGISTER message, the TO and FROM addresses relate to addressing information for proxy server 110, while the CONTACT address relates to user and addressing information for user device 102*a*. For example, the CONTACT field may include the following: sip:user102a@192.168.1.2:8000, where user 102*a* identifies the specific user, 192.168.1.2 is the private IP address associated with user device 102*a*, and 8000 is the port on user device 102*a* on which call messages are expected to be received.

Once the registration message has been received, firewall 112 may translate or map any private IP address information contained within both the header and payload of the outgoing call registration message to discrete and identifiable port designations of a single publicly routable firewall IP address, thereby generating a NAT'ed registration message (act 302). In this manner, each user device 102 is distinguished at firewall 112 by its associated port number(s) rather than its public IP address(es), since all user devices 102 will share a single or select number of public IP addresses. Using the above REGISTER message as an example, the CONTACT field may be modified to identify firewall 112's public IP address and a discrete port number selected from a range of available port numbers. For example, the CONTACT field may be modified to include: sip:user102a@205.10.2.10:3111, where 205.10.2.10 identifies the public IP address of firewall 112 and 3111 designates the port on which call messages directed to user device 102a are expected to be received.

Firewall 112 may also generate an entry in an incoming call table identifying the established relationship between user device 102a's private IP address(es) and port number(s) and its assigned firewall IP address(es) and port number(s) (act 304). In one implementation consistent with principles of the invention, the incoming call table may also include information relating to the type of communication messages expected to be received (e.g., SIP, H.323, etc.) as well as an expiration time for the registration. One exemplary implementation of an incoming call table for a number of user devices and communication types is shown below in Table 1.

TABLE 1

| User | Private Address | Public Address | Type | Expires |
|------|-----------------|----------------|------|---------|
| 102a | 192.168.1.1:8000 | 205.10.2.10:3111 | SIP | 3600 |
| 102b | 192.168.1.2:3002 | 205.10.2.10:3115 | H.323 | 7200 |
| 102b | 192.168.1.2:8005 | 205.10.2.10:3116 | SIP | 3600 |
| . | . | . | . | . |
| . | . | . | . | . |
| 102n | 192.168.1.x:wxyz | 205.10.2.10:abcd | SIP | 3600 |

By designating individual user devices 102 based upon port number rather than IP address, many user devices may be associated with a single public IP address. Entries in the incoming call table enable subsequent call invitation messages received at firewall 112 from user devices 106 in public network 108 to be accurately forwarded to appropriate user device 102.

The NAT'ed registration message is then forwarded to proxy server 110 for registration (act 306). Following registration, message processing by proxy server 110, incoming (and outgoing) calls may be made via proxy server 110 for the duration of time established in the registration messages expiration field. Accordingly, following proxy lookup of user device 102a's location information, an incoming call invitation message from user device 106a (either directly or via proxy server 110) may be received at firewall 112 (act 308).

As is known in the art, call invitation messages from user device 106a may be initially transmitted to proxy server 110. Following invitation message location and routing processing, proxy server 110 retrieves user device 102a's routable firewall IP address and port number as included in the registration message and may either directly forward the invitation message to firewall 112 or may notify user device 106a of the location and address associated with user device 102a, thereby enabling user device 106a to send the invitation message directly to firewall 112. The latter of these two modes is called redirect mode. Following call setup, media and other call-related messages typically pass directly between user device 106a and firewall 112, without involving proxy server 110. Specific details relating to proxy server processing and functionality are beyond the scope of the present invention and will not be discussed in detail.

Because user device 102a's registration with proxy server 110 identified its location as a discrete port at firewall 112's public IP address, it is this port which receives the incoming call invitation message from user device 106a (or proxy server 110). Following receipt of the call invitation message, firewall 112 retrieves the private IP address and port information associated with user device 102a from the incoming call table (act 310). It is then determined whether the type of the incoming call message (e.g., SIP, H.323, etc.) matches an established security policy for incoming call messages (act 312). If the message type does not match the policy (e.g., policy requires SIP, message is H.323), the message is dropped (act 314).

However, if the type of message matches the policy, the call invitation message is reverse translated to include user device 102a's private addressing information (act 316) and forwarded to user device 102a via private network 104 (act 318). Additional call setup and media messages exchanged between user device 102a and 106a follow a substantially similar process and will not be described in detail.

Figure 4:
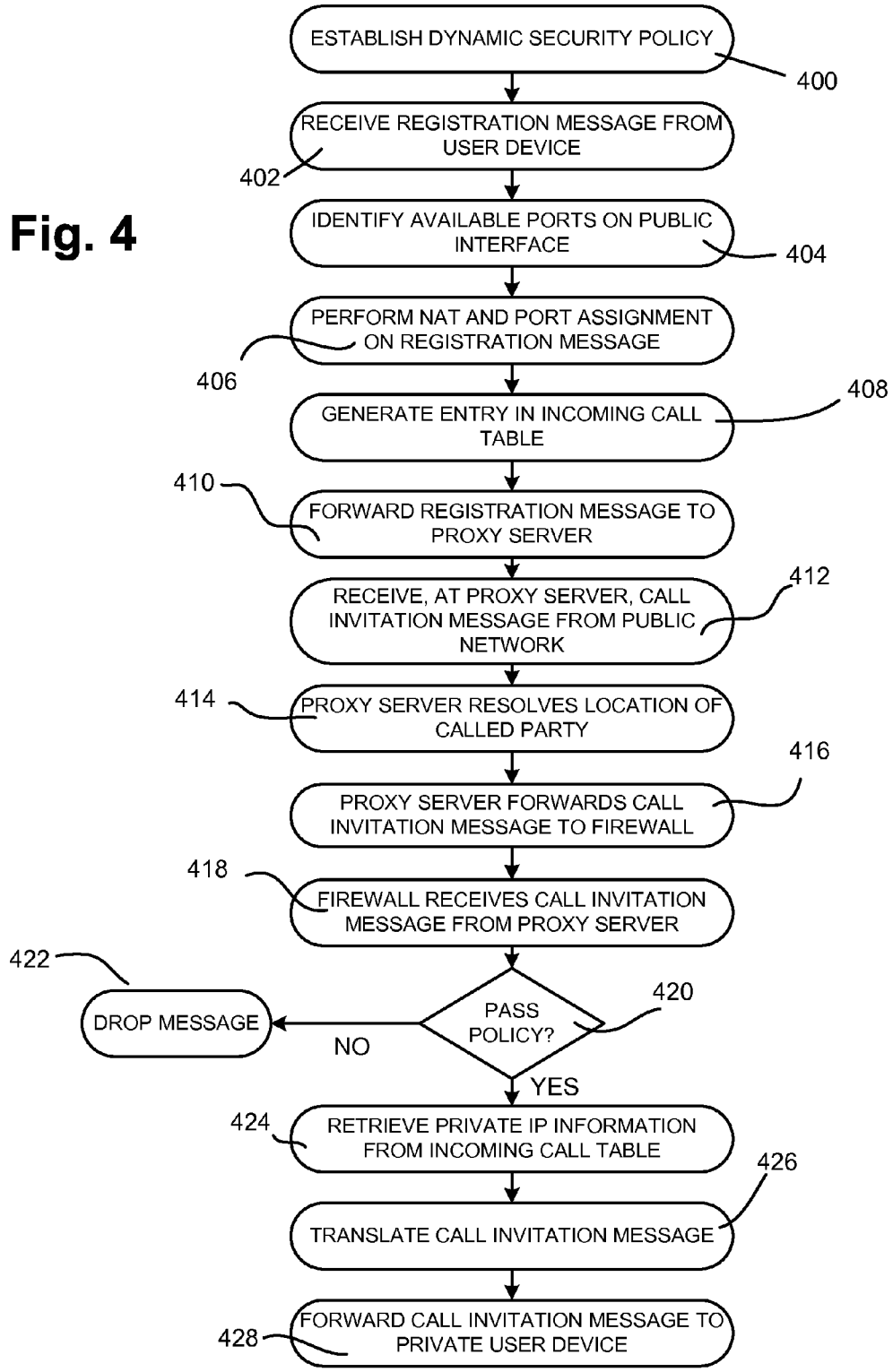
FIG. 4 illustrates an exemplary process for enabling incoming calls across a firewall in a second implementation consistent with principles of the invention.

FIG. 4 illustrates an exemplary process for enabling incoming calls across firewall 112 from a user device 106a on public network 108 to a user device 102a on private network 104 in another implementation consistent with principles of the invention. Processing may begin with firewall 112 establishing dynamic security policies suitable for enabling outgoing and incoming call messages to be sent/received on dynamically assigned ports (act 400). Traditional security policies rely upon known values for TO address, FROM address, and port number associated with a service type. For example, SIP signaling traffic is typically received at port 5060. As described above, by modifying the port numbers on the public interface, firewall 112 is able to provide incoming call functionality to a group of user devices using a single IP address. Accordingly, conventional policies would fail to support such dynamic port assignments. Accordingly, outgoing and incoming call policies may be set up which designate a "type" (e.g., SIP, H.323, etc.) rather than a port number. One exemplary implementation of such an outgoing policy may be defined as:

set policy from TRUST to UNTRUST any sip-proxy SIP permit, where TRUST and UNTRUST designate the interfaces across which the traffic is identified, any designates the sender's IP address, sip-proxy designates the IP address of the proxy server. Conversely, one exemplary implementation of an incoming call policy may be defined as:

set policy from UNTRUST to TRUST any dip(interface) SIP permit, where UNTRUST and TRUST designate the interfaces across which the traffic is identified, any designates the sender's IP address, dip(interface) designates the recipient's internal address that requires that the destination IP address/port be checked against the incoming call table, SIP designates the type, and permit indicates that traffic meeting the policy is permitted across firewall 112.

Following policy setup, a registration message may be received from a user device 102a (act 402). In accordance with one implementation consistent with principles of the invention, the registration message may be a SIP REGISTER message including data fields relating to TO, FROM, and CONTACT addresses/ports (or URL's associated therewith) and an EXPIRATION field relating to the length of the registration. The CONTACT field may include, for example: sip:user102a@192.168.1.2:8000, where User102a identifies the specific user, 192.168.1.2 is the private IP address associated with user device 102a, and 8000 is the port on user device 102a on which call messages are expected to be received.

Once the registration message has been received, firewall 112 may identify available ports on its routable IP interface (act 404). Upon identification of any available ports, firewall 112 may translate or map any private IP address information contained within both the header and payload of the outgoing call registration message to one (or more) of the available ports, thereby generating a NAT'ed registration message (act 406). In this manner, each user device 102 is distinguished at firewall 112 by its associated port number(s) rather than its public IP address(es), since all user devices 102 will share a single or select number of public IP addresses. Using the above REGISTER message as an example, the CONTACT field may be modified to identify firewall 112's public IP address and a discrete port number selected from a range of available port numbers. For example, the CONTACT field may be modified to include: sip:user102a@205.10.2.10:3111, where 205.10.2.10 identifies the public IP address of firewall 112 and 3111 designates a previously available port on which call messages directed to user device 102a are expected to be received.

Further, firewall 112 may generate an entry in an incoming call table identifying the established relationship between user device 102a's private IP address(es) and port number(s) and its assigned firewall IP address(es) and port number(s) (act 408). One example of a suitable incoming call table is shown above in Table 1.

The NAT'ed registration message is then forwarded to proxy server 110 for registration (act 410). Following registration, an incoming call invitation message from user device 106a may be received at proxy server 110 (act 412). Proxy server 110 resolves the invitation message and identifies the location of user device 102a based upon the information received in its registration message (act 414). In a true proxy mode, proxy server 110 then forwards the call invitation message to firewall 112 at the port designated in the registration message (e.g., 205.10.2.10:3111) (act 416). In the case of a redirect proxy mode, proxy server 110 sends the location of user device 102a back to user device 106a, facilitating direct communication between user device 106a and firewall 112.

Firewall 112 receives the forwarded call invitation message from proxy server 110 at the discrete port identified in the NAT'ed registration message (act 418). Firewall 112 next determines whether an incoming call policy (such as that described above) exists which enables the message to pass (act 420). As described above, a security policy was initially established in act 401 which enables traffic of a designated type to pass to user device 102a across firewall 112, even though discrete port information is dynamic and not known in advance of policy creation. If the invitation message does not meet the policy requirements, it is dropped (act 422). However, if the policy permits the invitation message, firewall 112 retrieves the private IP address and port information associated with user device 102a from the incoming call table (act 424). The call invitation message is then reverse translated to include user device 102a's private addressing information (act 426) and the translated invitation message is forwarded to user device 102a via private network 104 (act 428).

CONCLUSION

Implementations consistent with principles of the invention provide incoming VoIP messages to be received across a NAT/firewall boundary. More particularly, an initial user device registration message triggers assignment of routable addressing information on which subsequent call invitations may be received. This routable addressing information is then registered with a proxy server or gatekeeper to facilitate call invitations from user devices outside the private network.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention.

Moreover, while series of acts have been disclosed with regard to FIGS. 3-4, the order of the acts may be varied in other implementations consist with the present invention. Furthermore, non-dependent acts may be implemented in parallel.

It will also be apparent to one of ordinary skill in the art that aspects of the invention, as described above, may be implemented in may different forms of software, firmware, and hardware in the implementations illustrated in the figures. The actual software code or specialized control hardware used to implement aspects consistent with the principles of the invention is not limiting of the present invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" or be referred to as an "engine" that performs one or more functions. This logic/engine may include hardware, such as an application specific integrated circuit (ASIC) or a field programmable gate array, software, or a combination of hardware and software. While aspects have been described in terms of processing packet or packet data, these aspects may operate upon any type or form of data, including packet data and non-packet data. The term "data unit" may refer to packet or non-packet data.

No element, act, or instruction used in description of the present invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed is:

1. A method comprising:
   receiving, by a firewall and from a private user device, a registration message including a private internet protocol (IP) address associated with the private user device;
   associating, by the firewall, the private user device with a public IP address and a discrete port number;
   modifying, by the firewall, the registration message to include the public IP address and the discrete port number;
   receiving, by the firewall, a call invitation message associated with a public user device, the call invitation message being directed to the public IP address and the discrete port number associated with the private user device;
   identifying a communications message type to be received from the public user device;
   determining, by the firewall, whether the call invitation message satisfies a security policy, the call invitation message satisfying the security policy when the communications message type corresponds to one of a plurality of particular communications message types;

modifying, by the firewall and when the call invitation message satisfies the security policy, the call invitation message to include the private IP address associated with the private user device; and forwarding the call invitation message to the private user device based on the private IP address associated with the private user device.

2. The method of claim 1, further comprising:

forwarding the registration message to a proxy server for registration, and where the call invitation message is routed through the proxy server.

3. The method of claim 1, where the proxy server is one of a session initiation protocol (SIP) proxy or an H.323 gatekeeper.

4. The method of claim 1, where associating the private user device with a public IP address and a discrete port number further includes:

generating an entry in an incoming call table, the entry including data associated with the private IP address, the public IP address, and the discrete port number, and where modifying the call invitation message includes:

locating the entry in the incoming call table based on the public IP address and the discrete port number, accessing the entry to acquire the private IP address for the private user device, and inserting the private IP address into the call invitation message.

5. The method of claim 4, where the entry, in the incoming call table, further includes an expiration time, where the entry is removed from the incoming call table after the expiration time, and where the firewall rejects the call invitation message when the call invitation message is received after the entry in removed from the incoming call table.

6. The method of claim 1, where determining whether the call invitation message satisfies the security policy further comprises:

identifying an IP address associated with the public user device, and determining whether the call invitation message satisfies the security policy based on the identified IP associated with the public user device.

7. The method of claim 1, further comprising:

determining that the call invitation message does not satisfy the security policy;

retrieving, based on the call invitation message not satisfying the security policy, a different private IP address associated with the private user device;

modifying the call invitation message to include the different private IP address; and forwarding the call invitation message to the private user device based on the different private IP address.

8. A device comprising:

a memory to store instructions; and a processor to implement the instructions to:

receive, via a public network, a call invitation message associated with a public user device, the call invitation message being directed to a public IP address and a discrete port number associated with a private user device, identify a communications message type associated with the public user device, determine whether the call invitation message satisfies a security policy, the call invitation message satisfying the security policy when the communications message type corresponds to a particular communications message type, modify, when the call invitation message satisfies the security policy, the call invitation message to include a private IP address associated with the private user device, and forward, via a private network, the call invitation message to the private user device based on the private IP address associated with the private user device.

9. The device of claim 8, where the processor is further to:

store an incoming call table that associates the private IP address with the public IP address and the discrete port number.

10. The device of claim 8, where the call invitation message is received, via the public network, from a proxy server on behalf of the public user device.

11. The device of claim 10, where the processor is further to:

associate the public IP address and the discrete port number with the private IP address based on a registration message received from the private user device, and forward the registration message to the proxy server.

12. The device of claim 11, where the proxy server is one of a session initiation protocol (SIP) proxy or an H.323 gatekeeper, and where the proxy server is to process the registration message.

13. The device of claim 11, where the processor, when associating the private IP address with the public IP address and the discrete port number, is further to:

generate an entry in an incoming call table, the entry including data associated with the private IP address, the public IP address, and the discrete port number.

14. The device of claim 13, where the entry, in the incoming call table, further includes an expiration time, and where the processor is further to:

remove the entry from the incoming call table after the expiration time, and reject the call invitation message when the call invitation message is received after removing the entry from the incoming call table.

15. The device of claim 8, where the processor, when determining whether the call invitation message satisfies the security policy, is further to:

identify an IP address associated with the public user device, and determine whether the call invitation message satisfies the security policy based on the identified IP associated with the public user device.

16. The device of claim 8, where the processor is further to:

determine that the call invitation message does not satisfy the security policy;

retrieve, based on the call invitation message not satisfying the security policy, a different private IP address associated with the private user device;

modify the call invitation message to include the different private IP address; and forward the call invitation message to the private user device based on the different private IP address.

17. A non-transitory computer-readable memory to store instructions, the instructions comprising:

one or more instructions that, when executed by a processor, cause the processor to receive, via a public network, a call invitation message associated with a public user device, the call invitation message being directed to a public IP address and a discrete port number associated with a private user device, identify a communications message type associated with the public user device, determine whether the call invitation message satisfies a security policy, the call invitation message satisfying the security policy when the communications message type corresponds to a particular communications message type, modify, when the call invitation message satisfies the security policy, the call invitation message to include a private IP address associated with the private user device, and forward, via a private network, the call invitation message to the private user device based on the private IP address associated with the private user device.

18. The computer-readable memory of claim 17, where the call invitation message is received, via the public network, from a proxy server on behalf of the public user device, and where the instructions further comprise:

one or more instructions to:

store data associating the private IP address with the public IP address and the discrete port number, associate the public IP address and the discrete port number with the private IP address based on a registration message received from the private user device, and forward the registration message to the proxy server.

19. The computer-readable memory of claim 17, where at least one instruction, of the one or more instructions, to determine whether the call invitation message satisfies the security policy, further includes:

one or more instructions to:

identify an IP address associated with the public user device, and determine whether the call invitation message satisfies the security policy based on the identified IP associated with the public user device.

20. The computer-readable memory of claim 17, where the instructions further comprise:

one or more instructions to:

determine that the call invitation message does not satisfy the security policy, retrieve, based on the call invitation message not satisfying the security policy, a different private IP address associated with the private user device, modify the call invitation message to include the different private IP address, and forward the call invitation message to the private user device based on the different private IP address.

* * * * *

UNITED STATES PATENT AND TRADEMARK OFFICE
CERTIFICATE OF CORRECTION

PATENT NO. : 8,391,453 B2
APPLICATION NO. : 12/884595
DATED : March 5, 2013
INVENTOR(S) : Attila J. Hunyady et al.

It is certified that error appears in the above-identified patent and that said Letters Patent is hereby corrected as shown below:

Title Page, Item (75) Inventors: "Feng Zhou" should read -- Feng Zou --.

Signed and Sealed this
Twenty-first Day of May, 2013

Teresa Stanek Rea
*Acting Director of the United States Patent and Trademark Office*